US007377729B2

(12) United States Patent
Negroni

(10) Patent No.: US 7,377,729 B2
(45) Date of Patent: May 27, 2008

(54) METHOD OF DRILLING HOLES IN LENSES BY MEANS OF A NUMERICALLY-CONTROLLED DRILL AND APPARATUS FOR IMPLEMENTING SAID METHOD

(76) Inventor: Jean-Louis Negroni, 5 rue Faidherbe, Saint-Maur (FR) 94100

( * ) Notice: Subject to any disclaimer, the term of this patent is extended or adjusted under 35 U.S.C. 154(b) by 510 days.

(21) Appl. No.: 10/541,282

(22) PCT Filed: Nov. 18, 2004

(86) PCT No.: PCT/FR2004/002938

§ 371 (c)(1),
(2), (4) Date: Jul. 1, 2005

(87) PCT Pub. No.: WO2005/065907

PCT Pub. Date: Jul. 21, 2005

(65) Prior Publication Data

US 2006/0050237 A1 Mar. 9, 2006

(30) Foreign Application Priority Data

Dec. 3, 2003 (FR) .................................. 03 14183

(51) Int. Cl.
*B23B 35/00* (2006.01)
*B23B 41/00* (2006.01)

(52) U.S. Cl. .......................... 408/1 R; 408/91; 408/87

(58) Field of Classification Search ................ 408/1 R, 408/87, 13, 75, 91, 76, 234, 241 S; *G02C 1/00, G02C 1/02; B23B 41/00*
See application file for complete search history.

(56) References Cited

U.S. PATENT DOCUMENTS

| | | | | |
|---|---|---|---|---|
| 1,141,859 | A * | 6/1915 | Bader et al. | 408/91 |
| 1,727,888 | A * | 9/1929 | McCabe | 408/69 |
| 2,222,538 | A | 11/1940 | Maynard | 77/5 |
| 2,657,596 | A * | 11/1953 | De Armas | 408/61 |
| 3,876,325 | A * | 4/1975 | Clark | 408/1 R |
| 5,722,647 | A * | 3/1998 | Rattaro et al. | 269/45 |
| 2003/0097741 | A1 | 5/2003 | Feldman et al. | 29/26 A |

FOREIGN PATENT DOCUMENTS

| | | | |
|---|---|---|---|
| EP | 739683 | A1 * | 10/1996 |
| FR | 2 826 599 | | 1/2003 |
| FR | 2865046 | A1 * | 7/2005 |
| JP | 8-155806 | | 6/1996 |
| JP | 8-155945 | | 6/1996 |
| JP | 10-100134 | | 4/1998 |

* cited by examiner

*Primary Examiner*—Daniel W. Howell
(74) *Attorney, Agent, or Firm*—McCormick, Paulding & Huber LLP

(57) ABSTRACT

The present invention relates to a method and apparatus for drilling holes in lenses for making "rimless and pierced-lens" spectacles. According to the invention, the apparatus comprises: a bed (11) carrying a numerically-controlled drill (12) whose drill tool (15) is set on a vertical axis; a reference pointer (30, 33) mounted on the bed (11) to be movable between an active position in which it bears against a lens and a retracted position in which it leaves the lens clear; and a lens support (50) arranged to hold the lens (V) in a substantially horizontal plane, said support resting on a surface (20) that is secured to or integral with the above-mentioned bed (11) while the position of said support can be held stationary relative to said surface. The lens support (50) is moved to bring a reference point that is pre-marked on the lens (V) in abutment against the reference pointer, whereupon the lens is held stationary in that position and the reference pointer is retracted to enable the drill tool to perform a pre-programmed machining sequence.

17 Claims, 5 Drawing Sheets

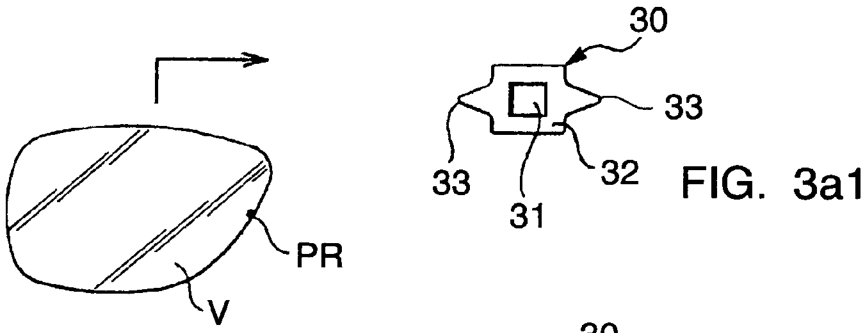
FIG. 3a1
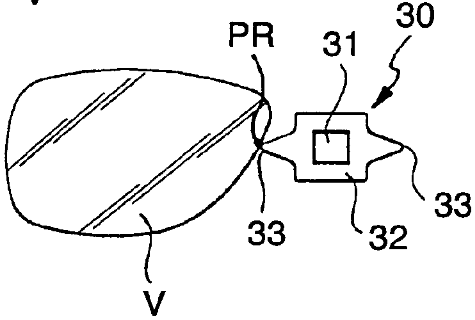
FIG. 3a2
FIG. 3b
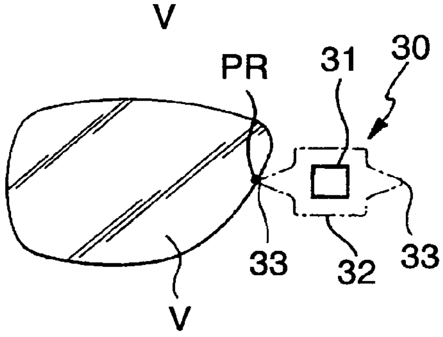
FIG. 3c
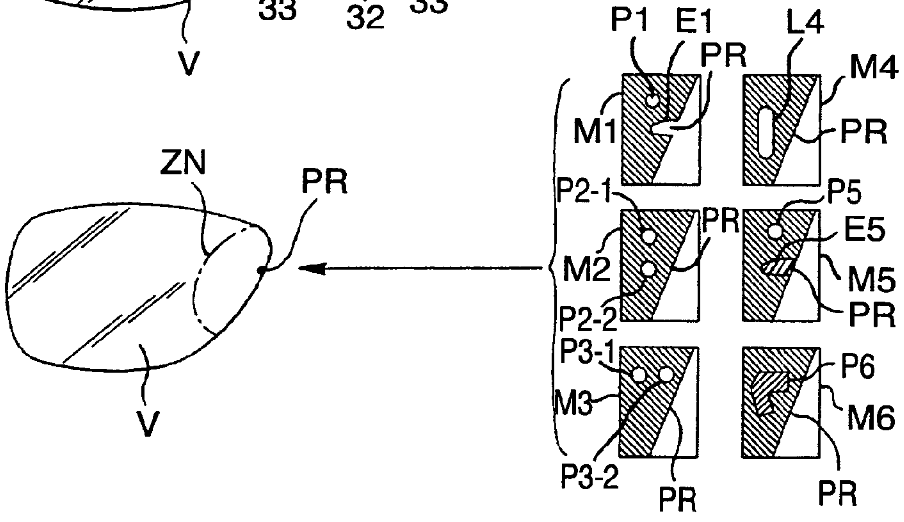
FIG. 3a'
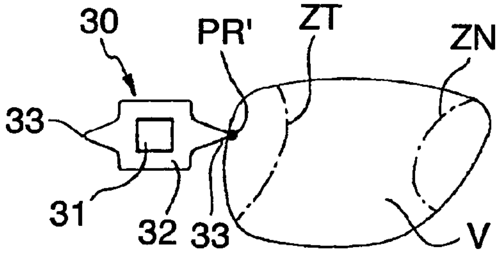

METHOD OF DRILLING HOLES IN LENSES BY MEANS OF A NUMERICALLY-CONTROLLED DRILL AND APPARATUS FOR IMPLEMENTING SAID METHOD

CROSS REFERENCE TO RELATED APPLICATIONS

This application is entitled to the benefit of and incorporates by reference essential subject matter disclosed in International Patent Application No. PCT/FR2004/002938 filed on Nov. 18, 2004 and French Patent Application No. 03 14183 filed on Dec. 3, 2003.

FIELD OF THE INVENTION

The present invention relates to drilling holes in lenses for making "rimless and pierced-lens" spectacles.

BACKGROUND OF THE INVENTION

Wire frame structures for spectacles have been in existence for a long time. Spectacle lenses are fastened to such wire frame structures by bolting systems or the like, the lenses then not being surrounded by the frame, i.e. being rimless. Each spectacle lens is then provided with one or more through holes and/or a through notch in the nose zone and in the temple zone of said lens. In order to secure each lens pierced in this way to a wire frame portion having a hinged arm, various mechanical fastening means have been proposed, the most common of which is constituted by bolting.

The problem then arises of how to perform the various machining in the nose zones and in the temple zones of the spectacle lenses as simply and as precisely as possible.

Document JP-A-8 155 945 describes a lens-drilling unit making it possible to form two through holes in the vicinities of respective ones of two opposite edges of each lens. That document describes a machining assembly having a structure that is very complex and expensive. Document JP-A-8 155 806 also describes a drill assembly having oscillating lens supports. For the purpose of drilling particular holes in lenses, reference can also be made to Document WO-A-00/68 729 describing a drill assembly serving to form oblong through holes, and to Document WO-A-99/37 449 describing a drill assembly adapted to machining blind holes in the thickness of the lens.

Unfortunately, the drill assemblies described in the above-mentioned documents are of complex structure and of high-cost.

Reference can also be made to Document FR-A-2 800 172 describing a method of drilling holes in lenses that is computer-aided so as to associate drilling plans with a given virtual lens template.

Document EP-A-0 739 683 describes an assembly for drilling holes in spectacles. That assembly is designed to form holes and notches in lenses. It provides a two-dimensional X,Y slide positionable on an angularly positionable guide mounted on a bed. While the lenses are being machined, the lens supports are moved relative to the drill tool in a horizontal plane, without rotation.

Document WO 00/67 974 describes apparatus for drilling holes in lenses with a complete system for supporting two drills. Each support is mounted to slide in horizontal translation, thereby making it possible to form a hole and a notch or two holes by two successive machining operations along a rectilinear path.

In general, if a numerically-controlled drill is used, the points to be machined are always identified on the basis of indexing from the center of the lens, said center being considered to be a reference zero point forming the origin of two coordinate axes in a horizontal plane. When the vertical axis of the drill tool is brought vertically over the center of the lens, the machine is calibrated, so that any subsequent X,Y movement makes it possible to position the tool exactly for the purpose of drilling the lens at a given point thereof. However, in order to perform such drilling, it is necessary for the numerically-controlled drill to store in a memory all of the shapes of lenses that are to be used, because each lens must be provided with holes and/or notches in the vicinities of its nose zone and of its temple zone at precise distances from the free edges of the lens. As a result, that technique is, de facto, limited to very conventional lens shapes, in particular circular, oval, square, or rectangular shapes, of outline pre-stored in a memory. The operator must then, on each occasion, search the memory for the corresponding lens outline, and then also search the memory for the desired machining pattern for the chosen lens. Such search requirements represent major constraints for operators, not to mention the risks of errors in the event that an outline is incorrectly stored in the memory. As a result, numerically-controlled drills used for drilling holes in lenses remain expensive and voluminous machines, which are reserved for large assembly workshops.

A need therefore exists for a mechanical drill that is more compact and easier to handle, and that opticians can use in their stores or in their assembly workshops.

Recently, a numerically-controlled mechanical drill has been proposed that was specially developed to form through notches in lenses, and optionally also holes. To this end, reference can be made to Document FR-A-2 826 599. That document describes a drill whose drill tool is movable manually in a vertical direction. In the associated method of implementation, provision is made to position the lens in a plane that is essentially perpendicular to the axis of rotation of the drill tool, so that the corresponding edge of the lens finds itself in abutment against the drill tool, which is then stationary, at a point of contact that is pre-marked on the lens, and the lens is held stationary in that position. It is only then that the drill tool is caused to rotate, and the lens is turned (moved in rotation) relative to the drill tool in a horizontal plane about a fixed point distinct from the axis of the drill tool, the amplitude of the turning movement corresponding to the length of the through notch that is to be machined. Then, the drill tool is moved away from the lens by manually raising said tool along its axis.

Such a mechanical drill constitutes an advantageous tool, but the approach used cannot be transposed to numerically-controlled drills.

SUMMARY OF THE INVENTION

An object of the present invention is to design a technique for drilling holes in lenses that does not suffer from the above-mentioned drawbacks and limitations, while using a numerically-controlled drill.

An object of the invention is thus to design a method of drilling and apparatus for implementing said method that are both simple and easy to implement, while also guaranteeing good precision in forming the desired holes or notches, without being in any way limited to a particular lens shape.

In accordance with the invention, this problem is solved by means of a method of drilling holes in lenses for making "rimless and pierced-lens" spectacles by means of a numerically-controlled drill having a tool support that is mounted to move in translation in three co-ordinate directions X, Y, Z, the associated drill tool being drivable in rotation about and movable in translation along its axis which is parallel to one of said directions, said method comprising the following successive steps:

- positioning a lens by moving it in a plane substantially perpendicular to the axis of the drill tool, relative to a reference pointer of position in said plane that is known to the numerically-controlled drill, until a pre-marked reference point on an edge of the lens is brought into abutment against the reference pointer, whereupon said lens is held stationary in that position;
- then bringing the drill tool towards the lens which continues to be held stationary, and retracting the reference pointer in order to leave clear the abutment zone of the lens; and
- controlling the drill tool so as to perform the pre-programmed machining sequences, by using the position of the reference point of the lens as a zero point for said sequences.

Thus, the zero point-for the machining sequences is constituted for the numerically-controlled drill by a reference point on the edge of the lens. It is thus easy to understand that pre-marking such a reference point on an edge of the lens is totally independent of the profile of said lens, in particular of the shape of its outline which can be of any imaginable fancy shapes going well beyond the geometric shapes usually used for spectacle lenses. It is thus possible to abandon referencing relative to the center of the lens, thereby making it possible to machine lenses of any shape without having to pre-store all of the shapes in question in a memory. The only memory storage requirement relates to the types of machining sequence that are to be performed with the numerically-controlled drill, as a function of the way the lenses are connected to the frame in question.

Preferably, during the step a), the right and the left lenses of the spectacles to be made are placed side-by-side, each lens having a reference point that is brought into abutment against an associated reference pointer, whereupon each lens is held stationary in its respective position, each reference pointer then being retracted during step b) for the respective pre-programmed sequences.

Advantageously, the reference pointers are then part of a common retractable piece on either side of which the right and the left lenses are brought to enable the holes in the nose zones or in the temple zones of both lenses to be formed symmetrically. In particular, after completion of the pre-programmed machining sequences on the nose zones or on the temple zones of both lenses, the positions are swapped over in another step a) in order then to perform the sequences on the other zones.

It is also possible to make provision so that, during step a), the or each lens is moved and then held stationary on a surface that is laterally tilted with a small angle of inclination so that the drill tool meets the lens in question perpendicularly to the face in question of said lens.

It is also possible to provide two juxtaposed sloping surfaces, of inclinations that are adjusted symmetrically for the right lens and for the left lens.

Advantageously, during step b), the reference pointer(s) is/are also retracted automatically or manually, in a direction parallel to the vertical direction Z.

Finally, during step c), it is preferable for the machining sequences to be taken from a memory in which a plurality of sequences have been input, each of which includes a plurality of through or non-through holes and/or notches, arranged in a predetermined pattern.

The invention also provides apparatus for implementing a drilling method having at least one of the preceding characteristics, said apparatus being remarkable in that it comprises:

- a substantially horizontal bed carrying a numerically-controlled drill having an overlying tool support that is movable in translation in three co-ordinate directions X, Y, Z and having a drill tool that is drivable in rotation about and is movable in translation along its own axis which remains substantially vertical;
- a reference pointer mounted on the bed to be movable between an active position in which it bears against a lens and a retracted position in which it leaves the lens clear; and
- a lens support arranged to hold the lens in a substantially horizontal plane, said support resting on a surface that is secured to or integral with the above-mentioned bed while the position of said support can be held stationary relative to said surface.

Preferably, the reference pointer comprises a vertical column fixed to the bed and a slide mounted to move on said column between an active high position and a retracted low position, said slide having at least one side edge serving as an abutment for the edge of the lens in question at a reference point thereon.

Advantageously, the slide of the reference pointer then has an abutment side edge on either said of the axis of the support column, and two lens supports are provided in order to put in place the right and left lenses, one next to the other. In particular, the abutment side edge provided on one side or on each side of the slide is a vertically extending rib.

It is then further possible to make provision for the slide to be held in the high position on the vertical column by mechanical or electromagnetic means, and for the slide to be caused to move downwards over its vertical column by mechanical, electrical, or electromagnetic means associated with the drill tool moving downwards.

In a particular embodiment, the bed underlies two support plates forming a V-shape, and whose upward or downward inclination is adjustable symmetrically by associated common adjustment means. This makes it possible to ensure that the drill tool meets the lens perpendicularly to the face in question of said lens.

Advantageously, the lens support comprises a block having declutchable magnetic locking, that can be held stationary in any position on the surface or on the inclined plates overlying the bed, the top face of said block being made of a ferromagnetic material, and said block underlying means for holding a lens in a substantially horizontal plane.

Finally, the lens support is preferably secured to the bed so as to move in two orthogonal directions corresponding to the co-ordinate directions X and Y.

Other characteristics and advantages of the invention will appear more clearly on reading the following description of the accompanying drawings, relating to a particular embodiment.

BRIEF DESCRIPTION OF THE DRAWINGS

Reference is made to the figures, in which:

FIGS. 3*a*1, 3*a*2, 3*b*, 3*c* and 3*a*' are diagrammatic plan views showing the successive steps of the drilling method of the invention as implemented on a single lens;

FIGS. 4*a*1, 4*a*2, 4*b*, 4*c* and 4*d* are diagrammatic plan views analogous to the views of FIG. 3, showing an implementation of the method of the invention on the right lens and on the left lens of the spectacles to be made.

DETAILED DESCRIPTION OF THE PREFERRED EMBODIMENTS

Figure 1:
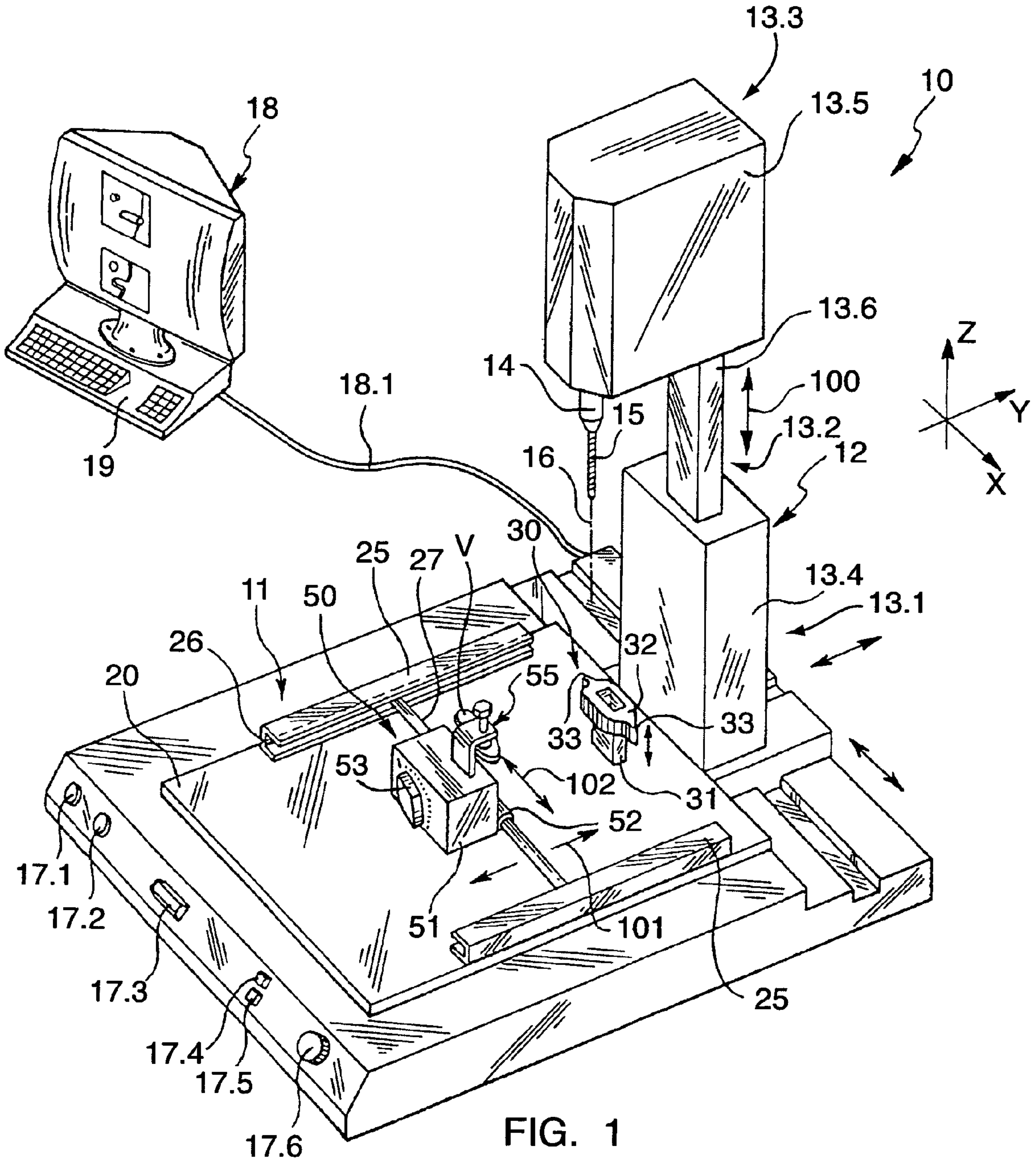
FIG. 1 is a perspective view showing an assembly of the invention for drilling holes in lenses, implementing the drilling method of the invention.

FIG. 1 shows an assembly referenced 10 for drilling holes in lenses. The assembly 10 includes a bed 11 that is essentially horizontal and that carries a numerically-controlled drill 12. The numerically-controlled drill 12 is, in this example, made up of three subassemblies 13.1, 13.2, 13.3, subassembly 13.3 contains an electric drive motor (not shown) whose outlet shaft is coupled to a chuck 14 serving to fasten a drill tool 15 such as a milling cutter. The drill tool is driven in rotation about its axis 16 by associated motorized drive means. In this example, the numerically-controlled drill 12 includes a bottom block 13.4 which is mounted on the bed 11 to be movable along two coordinate directions X and Y, and which underlies a tool support 13.5 mounted on a vertically-movable column 13.6. The tool support 13.5 is thus movable in controlled manner in a coordinate direction Z that is essentially vertical, in addition to the coordinate directions X and Y because it is mounted on the block 13.4.

Thus, the drill tool 15 is movable both in the X,Y directions of a horizontal plane, and also along its axis in the Z direction, as represented diagrammatically by the double-headed arrow 100. In practice, the drill tool 15 is a milling cutter of small diameter, e.g. about 1 millimeter (mm), in preference to a drill bit, so that it is possible to form holes of larger diameters by milling, without changing the drill tool, and more generally to form bored holes or milled holes that are of any shape and that are through holes or non-through holes.

The movement of the drill tool 15 can be controlled directly on the apparatus by means of adjustment buttons and associated switches provided on the front face of the bed 11, said buttons and switches being referenced 17.1, 17.2, 17.3, 17.4, 17.5, and 17.6. FIG. 1 also shows a personal computer (PC) 18 associated with a keyboard 19, which unit is connected via a cable 18.1 to the numerically-controlled drill 12. The computer unit is thus capable of sending instructions to cause the drill tool 15 to move over a predetermined path. Thus, as explained below, the computer unit 18 makes it possible not only to ensure that pre-programmed machining sequences take place properly, but also to have a certain number of standard sequences in the memory as a function of the holes and/or notches to be formed in the lens(es) in question.

The drill assembly 10 also includes a horizontal plate 20 mounted on the bed 11, said plate forming a bearing surface and, in this example, being constituted by a single plate of ferromagnetic material. A lens support referenced 50 is also provided that is arranged to hold a lens V in an essentially horizontal plane, said support that rests on the plate 20 being held stationary in position relative to said plate.

FIG. 1 also shows certain items of equipment associated with the lens support 50, which, in this example, is in the form of a block 51 having declutchable magnetic locking, and that can be held stationary in any position on the plate 20. FIG. 1 also shows a button 53 serving to control holding the support block 51 stationary in position, and holding means 55 serving to hold the lens to be machined in position. The arrangement of the support block 51 will be better understood on reading the portion of the description given below with reference to FIG. 2.

Two channel-section guideways 25, 25 can be seen that are laid on their sides so that they are open facing each other, and each guideway includes a rack 26. A cross-bar 27 whose ends carry pinions (not shown in FIG. 1), each of which meshes with a respective rack, serves to perform the X,Y positioning of the support block 51 by means of a straddling upside-down channel-section member 52 that fits snugly over the cross-bar 27. The X,Y movements of the support block 51 are represented diagrammatically in this example by double-headed arrows respectively 102 and 101.

FIG. 1 also shows other means of function that is essential in the present invention. These means are constituted by a reference pointer generally constituted by an assembly 30, and of position in the X,Y plane that is known to the numerically-controlled drill 12. In this example, the reference pointer 30 comprises a vertical column 31 fastened to the bed 11 (directly to the plate 20 in this example), and a slide 32 that is mounted to move vertically on said column, said slide having at least one side edge 33 constituted by a tapering rib that extends vertically. In this example, one side edge 33 is provided on either side of the slide 32, said rib preferably being made of a rigid plastics material such as nylon or the like, so that it is both precise and also does not run any risk of chipping or more generally damaging the edge of the lens that is brought into abutment against said rib, when implementing the procedure that is described below in more detail.

Figure 2:
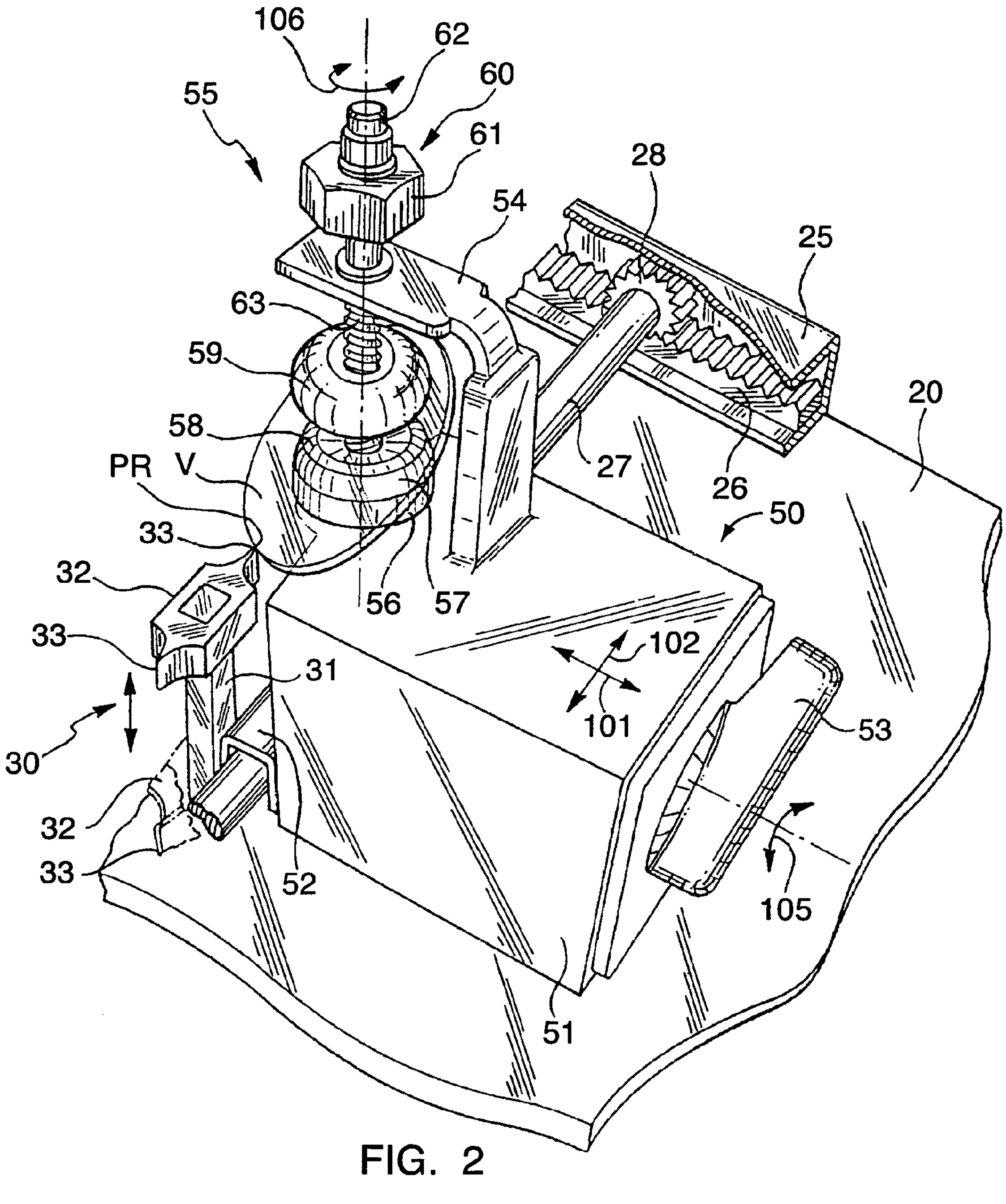
FIG. 2 is a fragmentary perspective view on a larger scale, showing a lens support equipping the apparatus of FIG. 1, which support is of the declutchable magnetic locking type, with associated X,Y guide means.

FIG. 2 shows the lens support 50 which is arranged to hold a lens V in an essentially horizontal plane, and the assembly 30 forming the reference pointer (in this example, in the high position in which it abuts against the lens).

The reference pointer assembly 30 thus comprises a column 31 which has a vertical axis, and which, in this example, is of rectangular section, and on which there can slide a slider 32 that carries two tapering vertical ribs 33 respectively projecting on either side of the axis of the column. The reference pointer is slidably mounted on the column 31 to move between a high position (shown in continuous lines) which corresponds to an active position in which it bears against the lens, as shown in FIG. 2, and a retracted position (as shown diagrammatically by a rib portion shown in chain-dotted lines in FIG. 2) in which it leaves the lens clear.

The slide 32 can be held in the high position on its vertical column by mechanical or electromagnetic means, which are not shown. For example, said means can be constituted by a retractable spring-loaded ball or by a magnet, or by any other equivalent means. The slide 32 can be caused to go from the high position to the low position by mechanical, electrical, or electromagnetic means which act in association with the drill tool being lowered, or, in a variant, manually by acting directly on the slide so as to push it down along its column. A simple manner of providing automatic control for controlling the downward movement of the slide 32 consists in providing a vertical rod (not shown) that is fastened to the tool support 13.5 and that comes into abutment against the slide 32 on lowering the drill tool, so that the reference pointer is automatically retracted when the drill tool reaches a working zone. In a variant, it is possible to use any system based on a cable or on an electromagnet for the purpose of automatically controlling moving the slide downwards.

It should be noted that the reference pointer shown has two abutment side edges 33 on either side of the axis of the column, which makes it possible to bring two lenses to be machined into abutment on either side of the reference pointer.

FIG. 2 also shows the lens support 50 in more detail, which lens support is arranged to hold a lens V in an essentially horizontal plane. The lens support 50 is thus in the form of a block 51 having declutchable magnetic locking, and which can be held stationary in any position on the plate 20, whose top face is made of a ferromagnetic material. A control knob 53 can turn, as represented diagrammatically by the double-headed arrow 105 between two positions corresponding respectively to the block 51 being held stationary in position on the top face of the plate 20, or to the magnetic block being released so as to enable the block 51 to slide freely over the top face of the plate 20. FIG. 2 also shows the straddling upside-down channel-section member 52 which is secured rigidly to the block 51, and which passes snugly and with as little friction as possible over the cross-bar 27. In FIG. 2, it is possible to see one end pinion 28 of the cross-bar, which pinion meshes with the associated rack 26 disposed inside the channel-section member 25 laid on its side. Movement in a direction parallel to the direction of the racks 26 corresponds to movement along the Y-axis, represented diagrammatically by the double-headed arrow 101, and transverse movement, along the axis of the cross-bar 27, corresponds to movement along the X-axis, represented diagrammatically by the double-headed arrow 102. The support 50 is thus secured to the plate 20 so as to move in two mutually orthogonal directions 101, 102 forming an X, Y coordinate system.

The block 51 having magnetic locking underlies holding means 55 for holding a lens V in a substantially horizontal plane. In practice, the holding means 55 can be formed in various manners, and, in the example shown, they are constituted by a bracket 54 rigidly secured to the block 51, said bracket supporting a moving assembly forming a clamp. The moving assembly includes a drive element 60 constituted by a knurled wheel 61 constrained to turn with a rod 62 whose bottom portion 63 is threaded, so that, by turning in one direction or in the other, as represented diagrammatically by the double-headed arrow 106, it is possible to raise or to lower a terminal holding pad 59. The lens V rests on a stationary portion constituted by a support 56 secured to the block 51. In this example, said support underlies a flexible assembly 57 terminating in an O-ring washer 58; In a variant of the flexible means 58, 59 used to clamp the lens, it is possible to use the superposed support terminating in a clamping shoe mounted on a ball-coupling, and thus making it possible to adapt naturally to accommodate the various curvatures of the inside and/or outside faces of the lenses to be clamped, each shoe preferably being equipped with an O-ring washer for guaranteeing contact with the lens without running the risk of scratching its surface. In addition, one or other of the portions that come into contact with the lens can be provided with a suction cup holder accessory (not shown herein) making it possible to receive, e.g. by interfitting, various models of suction cups used on lens grinders, and also merely with a part having an O-ring for clamping lenses not equipped with suction cups.

The structural components of the device are described above in detail with reference to FIGS. 1 and 2, and a description is given below of the method of the invention for drilling holes in lenses, with reference to FIGS. 3 and 4 which are more diagrammatic.

FIG. 3*a*1 shows a first step, during which a lens V is put in place, one edge of the lens having been-marked at a particular point referenced PR which is a reference point for the machining sequences that are subsequently to be performed on the lens. Naturally, the lens V is fastened to its magnetic-type support (not shown). The support is mounted to move in sliding abutment on the plate 20 along the X-axis and along the Y axis, thereby making it possible to move the lens V progressively until the reference point PR is brought exactly to the tip of the rib 33 forming the reference pointer, as shown at FIG. 3*a*2. Thus, in this step, the lens V is positioned by moving it in a plane that is substantially perpendicular to the axis 16 of the drill tool, relative to the reference pointer 30 of position in said plane that is known to the numerically-controlled drill 12, until the reference point PR (pre-marked on the edge of the lens V) is brought into abutment against the reference pointer 30, whereupon said lens in held stationary in that position. The lens is held stationary very simply, by turning the control knob 53 on the magnetic support 50.

In the next step shown in FIG. 3*b*, the drill tool 15 (not shown) is then brought towards the lens V which is still held. stationary, and the reference pointer 30 is retracted so that it leaves clear the abutment zone of the lens, as represented diagrammatically by the reference pointer being shown in chain-dotted lines. The drill tool 15 can then travel over any pre-established desired path relative to the lens whose position is known by means of the reference point PR.

In the step shown in FIG. 3*c*, the drill tool 15 is controlled so that it performs pre-programmed machining sequences, by using the position of the reference point PR of the lens V as the zero point for said sequences.

The machining sequences are preferably taken from a memory containing a plurality of sequences, each of the sequences including a plurality of notches and/or holes that can be through or non-through, and that are arranged in a predetermined pattern. In this example, said sequences concern the nose zone ZN of the lens V in question. Various patterns Ml to M6 are shown, each corresponding to types of machining that are commonly encountered with this type of frame. The various patterns are shown diagrammatically in FIG. 3*c*, in which the following patterns can be seen:

- pattern M1: a through hole P1 and a through notch E1;
- pattern M2: two through holes P2.1, P2.2 that are substantially superposed;
- pattern M3: two through holes P3.1, P3.2 that are substantially in line horizontally;
- pattern M4: a through hole L4 that is elongate in a substantially vertical direction;
- pattern M5: a through hole P5 and a non-through notch E5; and
- pattern M6: non-through surface machining P6 following a pattern for technical and/or attractive appearance purposes.

In all events, the drill tool 15 is controlled to perform pre-programmed machining sequences, by using the position of the reference point PR of the lens V as the zero point for said sequences.

Once the holes in the nose region ZN have been formed, it is possible to resume the same sequence of operations for forming the holes in the temple zone ZT of the same lens. This is shown diagrammatically as step FIG. 3*a*', during which the support for the lens V is moved again in the X,Y plane until another reference point PR' pre-marked on the opposite edge of the lens V is brought into abutment against the reference pointer 30, whereupon the lens is again held stationary in this position. The step shown in FIG. 3*b* of moving the drill tool towards or away from the reference pointer, and then the step shown in FIG. 3*c* of controlling the preprogrammed sequences for machining holes and/or notches then make it possible to form the holes desired for the temple zone ZT.

An advantageous variant of the above-described method is described below with reference to FIGS. 4*a*1-4*d*. This variant makes it possible to work directly on the right lens and the left lens of the spectacles to be formed.

Figure 4B:
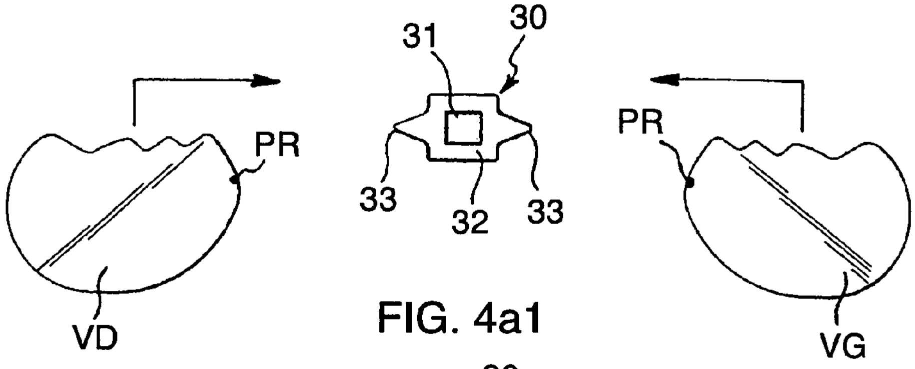
Figure 4B:
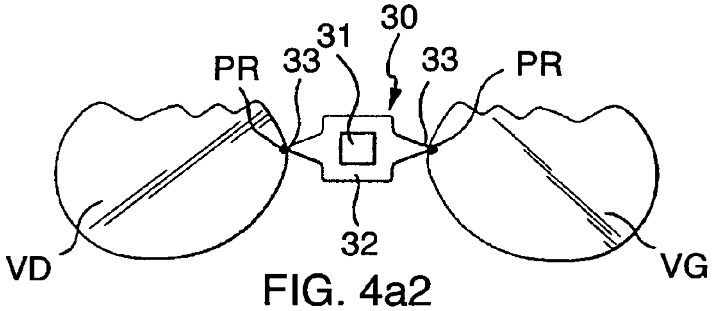
Figure 4B:
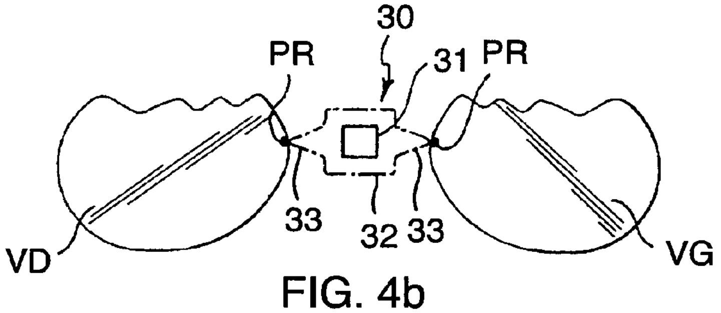
Figure 4C:
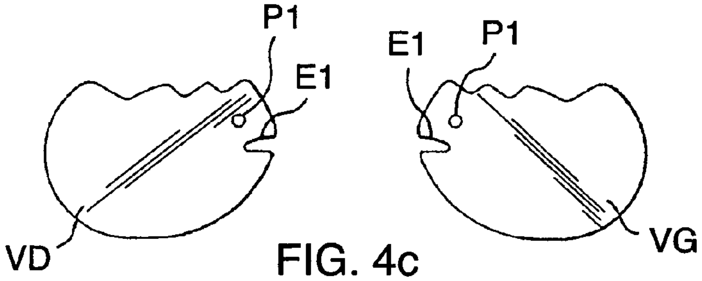

As shown diagrammatically at FIG. 4*a*1, the right lens VD and the left lens VG fastened to their respective magnetic supports are firstly disposed in abutment on the plate 20. In this example, the reference pointer 30 must be provided with two projecting abutment ribs 33, one on either side of the axis of the stationary column 31.

Each support is then moved so as to bring the reference point PR of each lens VD or VG against an abutment side edge 33, as shown at FIG. 3*a*2. Then, steps analogous to the above-described steps follow, with, FIG. 3*b*, the double reference pointer 33 being retracted as the drill tool approaches, then, at FIG. 3*c* the drill tool being controlled so as to perform the programmed machining sequences on each lens, by using the respective position of the reference point PR as a zero point for said sequences.

It should be observed that the guide means for guiding the lens supports used in this example make it possible to guarantee that the lenses VD and VG are aligned exactly in the X direction, so that, in practice, it could suffice to mark a reference PR on one of the lenses only, whereupon the support for the other lens is merely moved in the direction X until the free edge of the lens in question comes into contact with the other abutment side edge 33.

This is made possible by the fact that two lenses provided with their respective grinding suction cups that are centered exactly on the associated lenses are placed so that the two lenses are set strictly symmetrically about a vertical midplane, along the same axis, and at the same height.

Thus, as shown at FIG. 3*c*, the desired holes and/or notches are formed. in the right and the left lenses VD and VG. In this example, they are constituted by a hole P1 and by a through notch E1.

In order to machine the temple zones of each of the lenses, it is possible to use the above-described positioning means advantageously merely by swapping over the two lens supports, in order to bring the free edges of the temple zones into abutment against the abutment side zones 33. This is shown in FIG. 4*a*' in which it can be seen that the right and the left lenses have been swapped over.

Figure 4D:
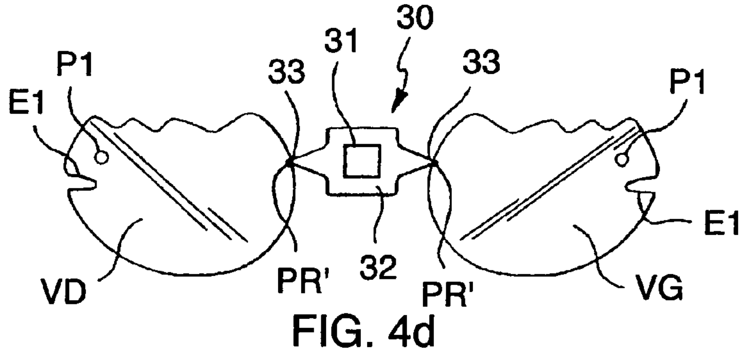

After said stepshown in FIG. 4*d*, the method resumes as described above, with the double reference pointer being retracted, and the pre-programmed machining sequences being controlled for each of the lenses, in the temple zone thereof.

The above-described procedure is quite suitable for machining lenses, be they sight-correcting or otherwise, of any outline shape, and of any thickness or material.

In certain cases, in particular when the curvature of the lenses is large, it can be advantageous to seek an inclined angular position for the lens to be machined, so that the drill tool of vertical axis cuts into the lens surface in question substantially perpendicularly to the tangential plane.

The apparatus of the invention is arranged for this purpose, and, for describing the arrangement, reference is made below to FIGS. 5A and 5B.

In these figures, there can be seen the horizontal plate 20 of the bed and the tool support 13.5 supporting the drill tool 15. Two lens supports 50 whose structures remain unchanged can also be seen. The main change lies in the presence of one or two (in this example, two) support plates 41 that can be tilted at an adjustable angle of inclination. By tilting laterally the bearing surface on which the lens support 50 rests, it is possible to change the angle of inclination of the lens fastened to said support, so that the face to be machined has a tangential plane that, locally, is substantially horizontal.

In this example, two support plates 41 are provided that are hinged together at a central pivot 42 extending in the Y direction, and thus forming a V-shape. The upward or downward tilt of the two support plates 41 is adjustable symmetrically by associated-common adjustment means 45 which, in this example, are constituted by an assembly of superposed washers 46 and a drive knurled wheel 47 making it possible, by turning said wheel about a vertical axis, to modify the inclination of the support plates 41, while also preserving the symmetry about a vertical midplane.

Figure 5A:
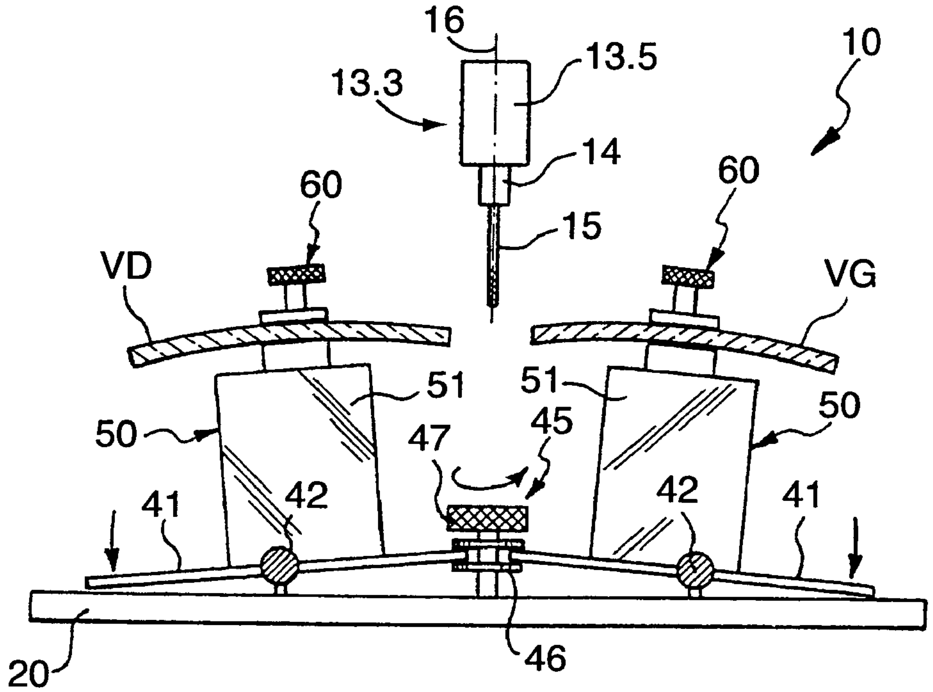
FIGS. 5A and 5B are elevation views showing how the lenses are put in place on surfaces that are laterally tilted with a small angle of inclination so that the drilling tool meets each lens perpendicularly to the respective convex or concave face in question.
Figure 5B:
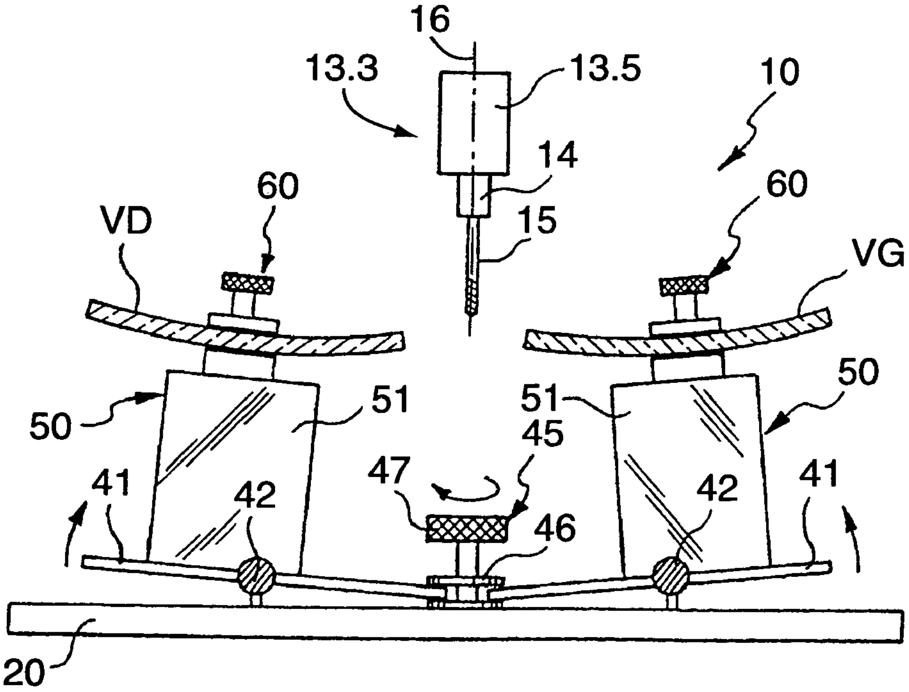

In FIG. 5A, the central portions of the support plates 41 are raised, with a view to the drill tool 15 being applied to the convex faces of the lenses. Conversely, in FIG. 5B, the central portions of the support plate 41 have been lowered, with a view to the drill tool 15 being applied to the concave faces of the two lenses.

It should be noted that the magnetic supports 50 being moved over the inclined plates 41 is in no way influenced by the above-described guide means having racks, by virtue of the guide system given by the bracket 52 associated with each block 51 of the lens support 50.

By symmetry, it is guaranteed that application is excellent for the convex or concave faces of each of the two right and left lenses.

It is thus possible to obtain a method and apparatus for drilling spectacle lenses, which method and apparatus use a numerically-controlled drill of small dimensions, which constitutes invaluable equipment for the optician, which equipment lies midway between manual drills and numerically-controlled drills of large workshops.

Naturally, the operator can monitor the machining sequences on the screen of a computer 18 in order to check that they are taking place properly. To this end, it is advantageous to make provision for the screen systematically to display an icon representing the selected machining pattern, in order to avoid any error in machining the lenses. In any event, only the machining patterns need to be stored in a memory, since, as explained above, the method of drilling of the invention is in no way dependent on the shape of the outline of the lens.

The invention is not limited to the above-described embodiment, but rather it covers any variant that reproduces the above-given essential characteristics using equivalent means.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of drilling holes in lenses for making "rimless and pierced-lens" spectacles by means of a numerically-controlled drill having a tool support that is mounted to move in translation in three co-ordinate directions X, Y, Z, the associated drill tool being drivable in rotation about and movable in translation along its axis which is parallel to one (Z) of said directions, said method comprising the following successive steps:

a) positioning a lens (V) by moving it in a plane substantially perpendicular to the axis of the drill tool, relative to a reference pointer of position in said plane that is known to the numerically-controlled drill, until a pre-marked reference point (PR) on an edge of the lens (V) is brought into abutment against the reference pointer, whereupon said lens is held stationary in that position;

b) then bringing the drill tool towards the lens (V) which continues to be held stationary, and retracting the reference pointer in order to leave clear the abutment zone of the lens; and c) controlling the drill tool so as to perform the pre-programmed machining sequences, by using the position of the reference point (PR) of the lens (V) as a zero point for said sequences.

2. The method according to claim 1, wherein, during the step a), the right and the left lenses (VD, VG) of the spectacles to be made are placed side-by-side, each lens having a reference point (PR) which is brought into abutment against an associated reference pointer, whereupon each lens (VD, VG) is held stationary in its respective position, each reference pointer then being retracted during step b) for the respective pre-programmed sequences.

3. The method according to claim 2, wherein the reference pointers are part of a common retractable piece on either side of which the right and the left lenses (VD, VG) are brought to enable the holes in the nose zones (ZN) or in the temple zones (ZT) of both lenses to be formed symmetrically.

4. The method according to claim 3, wherein, after completion of the pre-programmed machining sequences on the nose zones (ZN) or on the temple zones (ZT) of both lenses (VD, VG), the positions are swapped over in another step a) in order then to perform the sequences on the other zones.

5. The method according to claim 1, wherein during step a), the or each lens is moved and then held stationary on a surface that is laterally tilted with a small angle of inclination so that the drill tool meets the lens in question perpendicularly to the face in question of said lens.

6. The method according to claim 2, wherein, during step a), the or each lens is moved and then held stationary on a surface that is laterally tilted with a small angle of inclination so that the drill tool meets the lens in question perpendicularly to the face in question of said lens, and wherein two juxtaposed sloping surfaces are provided, of inclinations that are adjusted symmetrically for the right lens (VD) and for the left lens (VG).

7. The method according to claim 1, wherein, during step b), the reference pointer(s) is/are retracted automatically or manually, in a direction parallel to the vertical direction (Z).

8. The method according to claim 1, wherein, during step c), the machining sequences are taken from a memory in which a plurality of sequences have been input, each of which includes a plurality of through or non-through holes and/or notches, arranged in a predetermined pattern (M1 to M6).

9. An apparatus for implementing a drilling method, said apparatus comprising:

a substantially horizontal bed carrying a numerically-controlled drill having an overlying tool support that is movable in translation in three co-ordinate directions X, Y, Z and having a drill tool that is drivable in rotation about and is movable in translation along its own axis which remains substantially vertical;

a reference pointer mounted on the bed to be movable between an active position in which it bears against a lens and a retracted position in which it leaves the lens clear; and a lens support arranged to hold the lens (V) in a substantially horizontal plane, said support resting on a surface that is secured to or integral with the above-mentioned bed while the position of said support can be held stationary relative to said surface.

10. The apparatus according to claim 9, wherein the reference pointer comprises a vertical column fixed to the bed and a slide mounted to move on said column between an active high position and a retracted low position, said slide having at least one side edge serving as an abutment for the edge of the lens in question at a reference point (PR) thereon.

11. The apparatus according to claim 10, wherein the slide of the reference pointer has an abutment side edge on either said of the axis of the support column, and two lens supports (50) are provided in order to put in place the right and left lenses (VD, VG), one next to the other.

12. The apparatus according to claim 10, wherein the abutment side edge provided on one side or on each side of the slide is a vertically extending rib.

13. The apparatus according to claim 10, wherein the slide is held in the high position on the vertical column by mechanical or electromagnetic means.

14. The apparatus according to claim 10, wherein the slide is caused to move downwards over its vertical column by mechanical, electrical, or electromagnetic means associated with the drill tool moving downwards.

15. The apparatus according to claim 9, wherein the bed underlies two support plates forming a V-shape, and whose upward or downward inclination is adjustable symmetrically by associated common adjustment means.

16. The apparatus according to claim 9, wherein the lens support comprises a block having declutchable magnetic locking, that can be held stationary in any position on the surface or on the inclined plates overlying the bed, the top face of said block being made of a ferromagnetic material, and said block underlying means for holding a lens (V) in a substantially horizontal plane.

17. The apparatus according to claim 9, wherein the lens support is secured to the bed so as to move in two orthogonal directions corresponding to the co-ordinate directions X and Y.

* * * * *